United States Patent
Cheng

(10) Patent No.: US 9,944,208 B2
(45) Date of Patent: Apr. 17, 2018

(54) LEG REST DEVICE OF POWER VEHICLE

(71) Applicant: MERITS HEALTH PRODUCTS CO., LTD., Taichung (TW)

(72) Inventor: Ming-Chuan Cheng, Taichung (TW)

(73) Assignee: Merits Health Products Co., Ltd., Taichung (TW)

( * ) Notice: Subject to any disclaimer, the term of this patent is extended or adjusted under 35 U.S.C. 154(b) by 62 days.

(21) Appl. No.: 15/153,345

(22) Filed: May 12, 2016

(65) Prior Publication Data
US 2016/0331609 A1 Nov. 17, 2016

(30) Foreign Application Priority Data
May 15, 2015 (TW) .............................. 104115673 A

(51) Int. Cl.
| | | |
|---|---|---|
| *A47C 7/50* | (2006.01) | |
| *B60N 3/06* | (2006.01) | |
| *B60N 2/44* | (2006.01) | |
| *A61G 5/12* | (2006.01) | |

(52) U.S. Cl.
CPC ............. *B60N 3/063* (2013.01); *A61G 5/127* (2016.11); *A61G 5/128* (2016.11); *B60N 2/4495* (2013.01)

(58) Field of Classification Search
CPC ...... B60N 3/063; B60N 2/4495; A61G 5/128; A61G 5/127; A61G 5/12; A61G 5/04
USPC ............ 297/344.12, 344.17, 344.15, 423.32, 297/378.1, 423.1; 74/564
See application file for complete search history.

(56) References Cited

U.S. PATENT DOCUMENTS

| | | | | |
|---|---|---|---|---|
| 4,967,864 A | * | 11/1990 | Boyer | A61G 5/045 180/65.1 |
| 5,112,076 A | * | 5/1992 | Wilson | A61G 5/045 180/907 |
| 5,141,250 A | * | 8/1992 | Morgan | A61G 5/08 280/250.1 |
| 6,866,288 B2 | * | 3/2005 | Martin | A61G 5/006 280/250.1 |
| 8,444,226 B2 | * | 5/2013 | Driessen | B60N 2/4495 297/423.28 |
| 2003/0075967 A1 | * | 4/2003 | Ciolfe | A61G 5/12 297/423.32 |

(Continued)

FOREIGN PATENT DOCUMENTS

| | | |
|---|---|---|
| TW | M322816 U | 12/2007 |
| TW | M481846 U | 7/2014 |

*Primary Examiner* — Chi Q Nguyen
(74) *Attorney, Agent, or Firm* — Muncy, Geissler, Olds & Lowe, P.C.

(57) ABSTRACT

A leg rest device of a power vehicle includes: a supporting unit; a first lifting unit pivotally provided at the supporting unit and pivotable with respect to the supporting unit; a second lifting unit mounted to the first lifting unit and movable in a telescoping manner; an actuation unit connected to the supporting unit and configured to drive the first lifting unit; and a linkage unit having a first connecting member, a second connecting member, and a third connecting member, wherein the first connecting member and the second connecting member are separately and pivotally connected to the supporting unit while the third connecting member is separately and pivotally connected to the first connecting member, the second connecting member, and the second lifting unit.

15 Claims, 9 Drawing Sheets

(56) References Cited

U.S. PATENT DOCUMENTS

| | | | |
|---|---|---|---|
| 2006/0086202 A1* | 4/2006 | Barlow | A61G 5/12 74/564 |
| 2008/0066794 A1* | 3/2008 | Durfee | A01M 31/025 135/96 |
| 2010/0244534 A1* | 9/2010 | Driessen | B60N 2/4495 297/423.35 |
| 2011/0304186 A1* | 12/2011 | Andrews | A61G 5/1059 297/344.16 |
| 2012/0080246 A1* | 4/2012 | Engman | A61G 5/12 180/65.1 |
| 2015/0202103 A1* | 7/2015 | Olst | A61G 5/04 297/423.32 |
| 2016/0022038 A1* | 1/2016 | Cheng | A61G 5/1067 297/362.12 |

\* cited by examiner

LEG REST DEVICE OF POWER VEHICLE

BACKGROUND OF THE INVENTION

1. Technical Field

The present invention relates to power vehicles and more particularly to a leg rest device of a power vehicle.

2. Description of Related Art

Some leg rest devices of known power vehicles are actuated by a linkage, in which the number and arrangement of the connecting members may result in unstable support.

Moreover, the leg rest devices of known power vehicles tend to take up too much space in the not-lifted state as well as the lifted state and therefore compromise the vehicles' overall compactness.

In addition, the leg rest devices of known power vehicles may produce an uncomfortable riding experience due to the speeds at which they are raised or lowered.

BRIEF SUMMARY OF THE INVENTION

In view of the aforesaid drawbacks of the prior art and their consequences, it is an objective of the present invention to provide a leg rest device of a power vehicle, wherein the leg rest device features not only smooth actuation, but also enhanced stability of support, downsized components, and a reduced actuation space in comparison with those of its prior art counterparts.

To achieve the objective, the present invention discloses a leg rest device of a power vehicle, wherein the leg rest device includes: a supporting unit; a first lifting unit, which is pivotally provided at and can pivot with respect to the supporting unit; a second lifting unit, which is mounted to the first lifting unit and is configured to move in a telescoping manner; an actuation unit connected to the supporting unit and configured to drive the first lifting unit; and a linkage unit, which has a first connecting member, a second connecting member, and a third connecting member, the former two connecting members being separately and pivotally connected to the supporting unit, the third connecting member being separately and pivotally connected to the first connecting member, the second connecting member, and the second lifting unit.

Preferably, the first connecting member of the linkage unit has an escape portion configured to avoid the pivotally connected portions of the supporting unit and the second connecting member, and the second connecting member has an escape portion configured to avoid the pivotally connected portions of the first connecting member and the third connecting member.

Preferably, the distance from the center of the pivot joint between the first connecting member and the third connecting member of the linkage unit to the center of the pivot joint between the first connecting member and the supporting unit is greater than the distance from the center of the pivot joint between the first connecting member and the supporting unit to the center of the pivot joint between the second connecting member and the supporting unit.

Preferably, the distance from the center of the pivot joint between the first connecting member and the third connecting member of the linkage unit to the center of the pivot joint between the first connecting member and the supporting unit is greater than the distance from the center of the pivot joint between the second connecting member and the third connecting member to the center of the pivot joint between the second connecting member and the supporting unit.

Preferably, the line extending from the center of the pivot joint between the third connecting member and the first connecting member to the center of the pivot joint between the third connecting member and the second lifting unit forms an included angle less than 180 degrees with the line extending from the center of the pivot joint between the third connecting member and the first connecting member to the center of the pivot joint between the third connecting member and the second connecting member.

Preferably, the first lifting unit has a slide groove, and the pivotally connected portions of the third connecting member and the second lifting unit are provided with a sliding block slidably fitted in the slide groove of the first lifting unit.

According to the present invention, the second lifting unit is driven by actuation of the linkage unit. This allows the second lifting unit to be supported securely, the dimensions and actuation space of the linkage unit to be relatively small, and both the first lifting unit and the second lifting unit to be actuated smoothly and stably.

The structural and actuation features and intended effects of the disclosed leg rest device of a power vehicle will be described in more detail below.

DETAILED DESCRIPTION OF THE INVENTION

Figure 1:
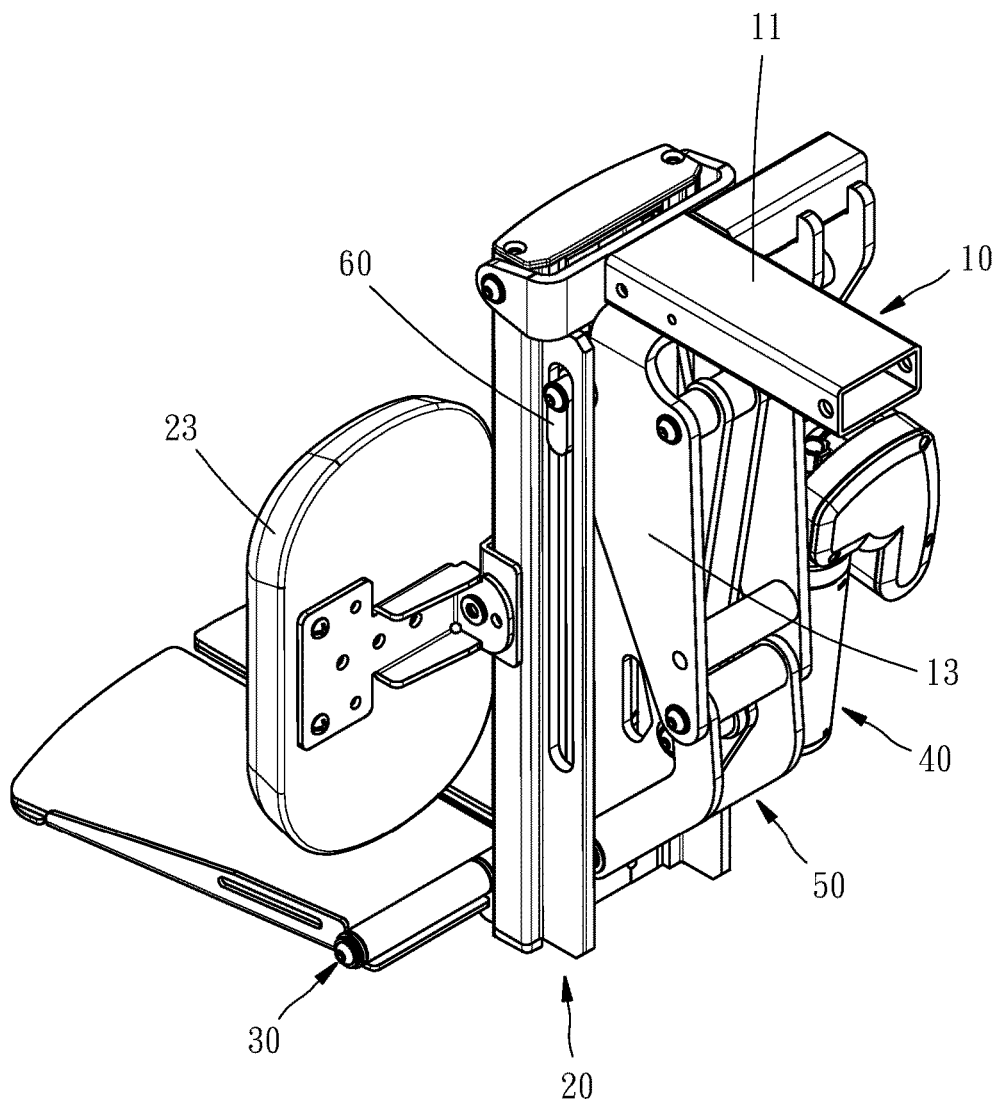
FIG. 1 is an assembled perspective view of a preferred embodiment of the present invention.

Hereinafter, the structure and features of the present invention are detailed with reference to an illustrative embodiment and the accompanying drawings. Please note the same reference numerals in the drawings denote identical or similar elements, components, objects, structures, or devices.

As shown in the drawings, the leg rest device of a power vehicle, i.e. a wheelchair, according to a preferred embodiment of the present invention includes a supporting unit 10, a first lifting unit 20, a second lifting unit 30, an actuation unit 40, and a linkage unit 50.

The supporting unit 10 is provided at the chassis or seat of the power vehicle or is a part of the chassis or seat. The supporting unit 10 has a first supporting member 11, which extends horizontally; a second supporting member 12, which is connected to the first supporting member 11 and extends both horizontally and laterally with respect to the first supporting member 11; and a third supporting member 13, which is connected to the first supporting member 11 and extends downward.

The first lifting unit 20 is pivotally provided at the first supporting member 11 of the supporting unit 10 and can pivot with respect to the supporting unit 10. The first lifting unit 20 has a main body 21, which in this embodiment is a concave (or grooved) extruded component; two slide grooves 22, which are formed on the left and right sides of the main body 21 respectively; and a leg cushion 23 mounted on the main body 21.

The second lifting unit 30 has a main body 31, which is mounted to the first lifting unit 20 and can move in a telescoping manner; a footrest 32 mounted on the main body 31; and a pivot block 33 mounted on the main body 31. The main body 31 in this embodiment is also an extruded component and is slidably engaged with the main body 21 of the first lifting unit 20.

The actuation unit 40 is connected to the supporting unit 10 and is configured to drive the first lifting unit 20. The actuation unit 40 has a first actuating rod 41 and a second actuating rod 42. The second actuating rod 42 can move in a telescoping manner with respect to the first actuating rod 41.

The linkage unit 50 has two first connecting members 51 and two second connecting members 52, all of which are separately and pivotally connected to the third supporting member 13 of the supporting unit 10, and two third connecting members 53, each of which is separately and pivotally connected to a corresponding one of the first connecting members 51 and a corresponding one of the second connecting members 52. The third connecting members 53 are further pivotally connected to the second lifting unit 30. In this embodiment, the third connecting members 53 are pivotally connected to the pivot block 33 of the second lifting unit 30.

Each of the pivotally connected portions of the third connecting members 53 and the second lifting unit 30 is provided with a sliding block 60 slidably fitted in a corresponding one of the slide grooves 22 of the first lifting unit 20.

Please note that spacers needed between pivotally connected components are provided, although not indicated by reference numerals.

In this embodiment, the first connecting members 51 are located between the second connecting members 52 and the first lifting unit 20. Differently put, the first connecting members 51 are located between the second connecting members 52, the third connecting members 53, and the supporting unit 10.

Each first connecting member 51 of the linkage unit 50 has an escape portion 511 configured to avoid the pivotally connected portions of the third supporting member 13 of the supporting unit 10 and the corresponding second connecting member 52. Each second connecting member 52 also has an escape portion 521 configured to avoid the pivotally connected portions of the corresponding first connecting member 51 and the corresponding third connecting member 53.

The distance from the center of the pivot joint between each first connecting member 51 and the corresponding third connecting member 53 of the linkage unit 50 to the center of the pivot joint between the first connecting member 51 and the supporting unit 10 is greater than the distance from the center of the pivot joint between the first connecting member 51 and the supporting unit 10 to the center of the pivot joint between the corresponding second connecting member 52 and the supporting unit 10.

Moreover, the distance from the center of the pivot joint between each first connecting member 51 and the corresponding third connecting member 53 of the linkage unit 50 to the center of the pivot joint between the first connecting member 51 and the supporting unit 10 is greater than the distance from the center of the pivot joint between the corresponding second connecting member 52 and the corresponding third connecting member 53 to the center of the pivot joint between the corresponding second connecting member 52 and the supporting unit 10.

Further, the distance from the center of the pivot joint between each third connecting member 53 and the second lifting unit 30 to the center of the pivot joint between the third connecting member 53 and the corresponding second connecting member 52 is greater than the distance from the center of the pivot joint between the supporting unit 10 and the corresponding first connecting member 51 of the linkage unit 50 to the center of the pivot joint between the supporting unit 10 and the corresponding second connecting member 52.

In addition, an included angle less than 180 degrees is formed between the line extending from the center of the pivot joint between each third connecting member 53 and the corresponding first connecting member 51 to the center of the pivot joint between the third connecting member 53 and the second lifting unit 30 and the line extending from the center of the pivot joint between the third connecting member 53 and the corresponding first connecting member 51 to the center of the pivot joint between the third connecting member 53 and the corresponding second connecting member 52. As such, the third connecting members 53 not only allow the leg rest device to take up a relatively small space when folded, but also can lie flat against the first lifting unit 20 so that the leg rest device is even more secure when folded.

Figure 2:
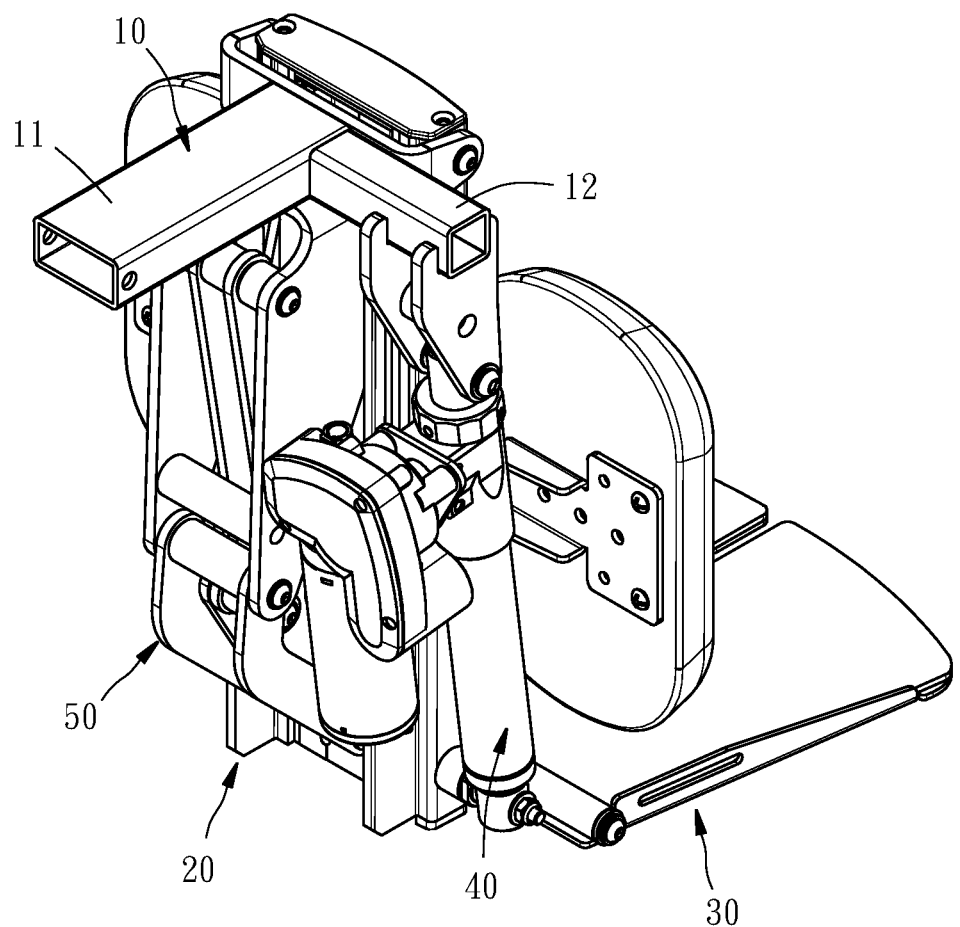
FIG. 2 is another assembled perspective view of the preferred embodiment in FIG. 1.
Figure 3:
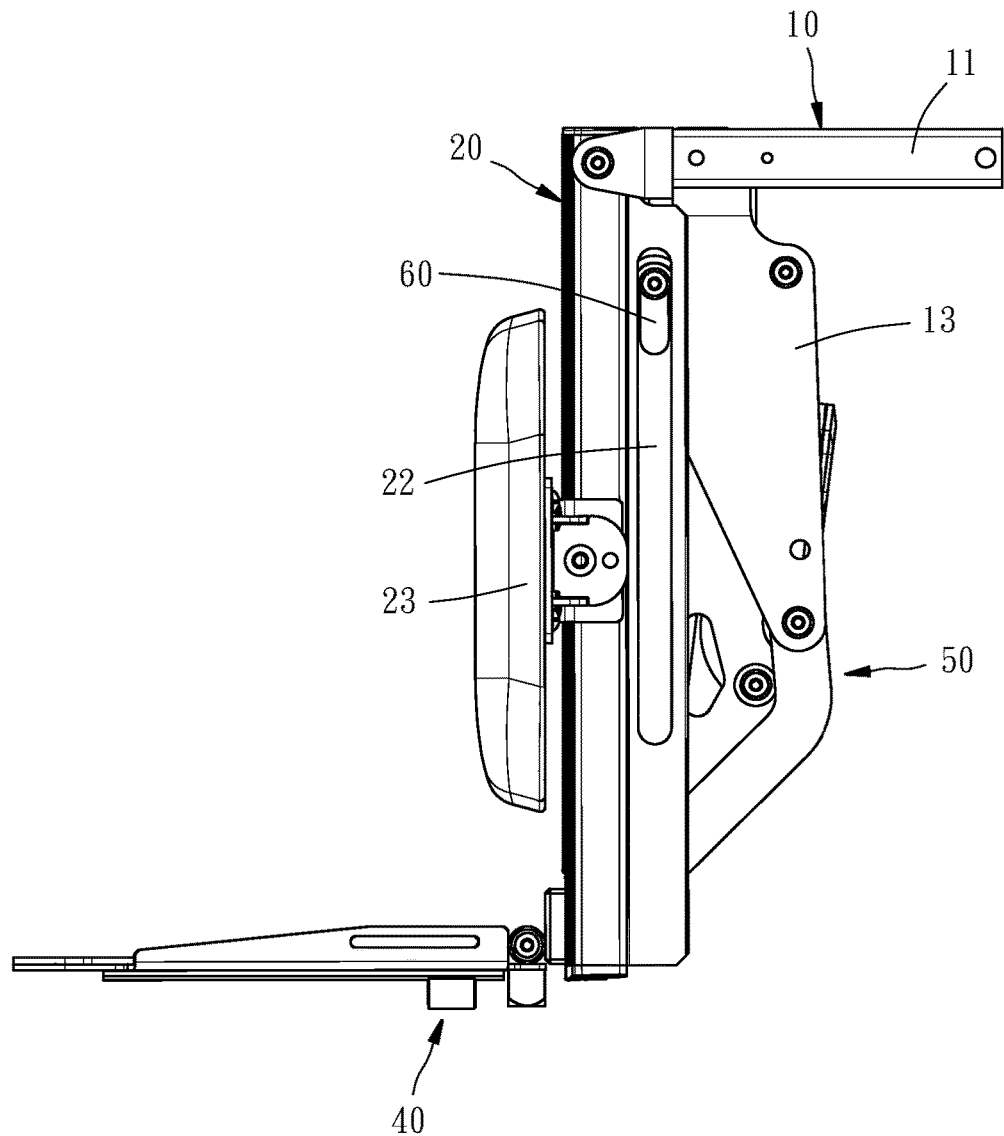
FIG. 3 is an assembled side view of the preferred embodiment in FIG. 1, showing the non-lifted state.
Figure 4:
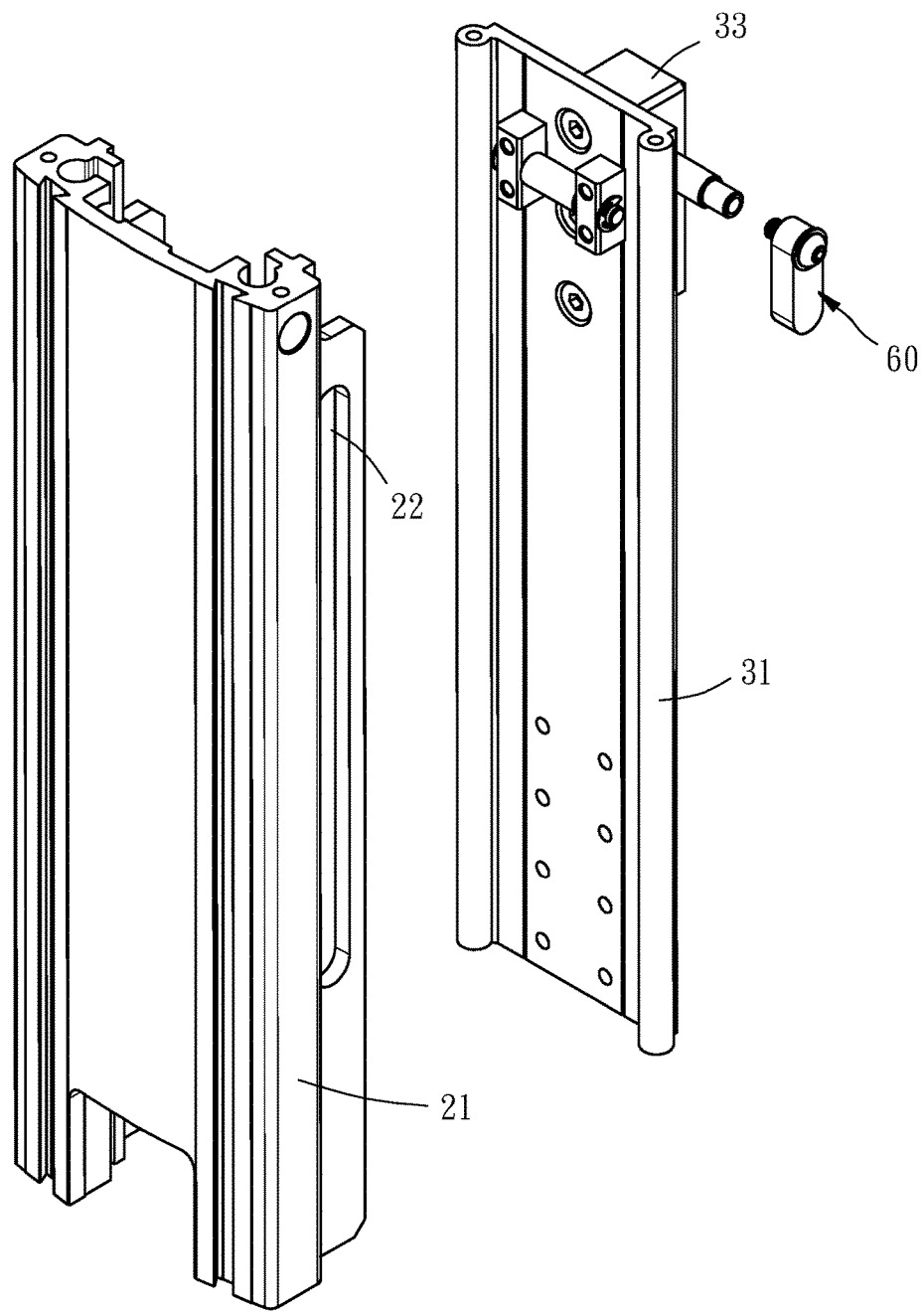
FIG. 4 is an exploded perspective view of some components of the preferred embodiment in FIG. 1.
Figure 5:
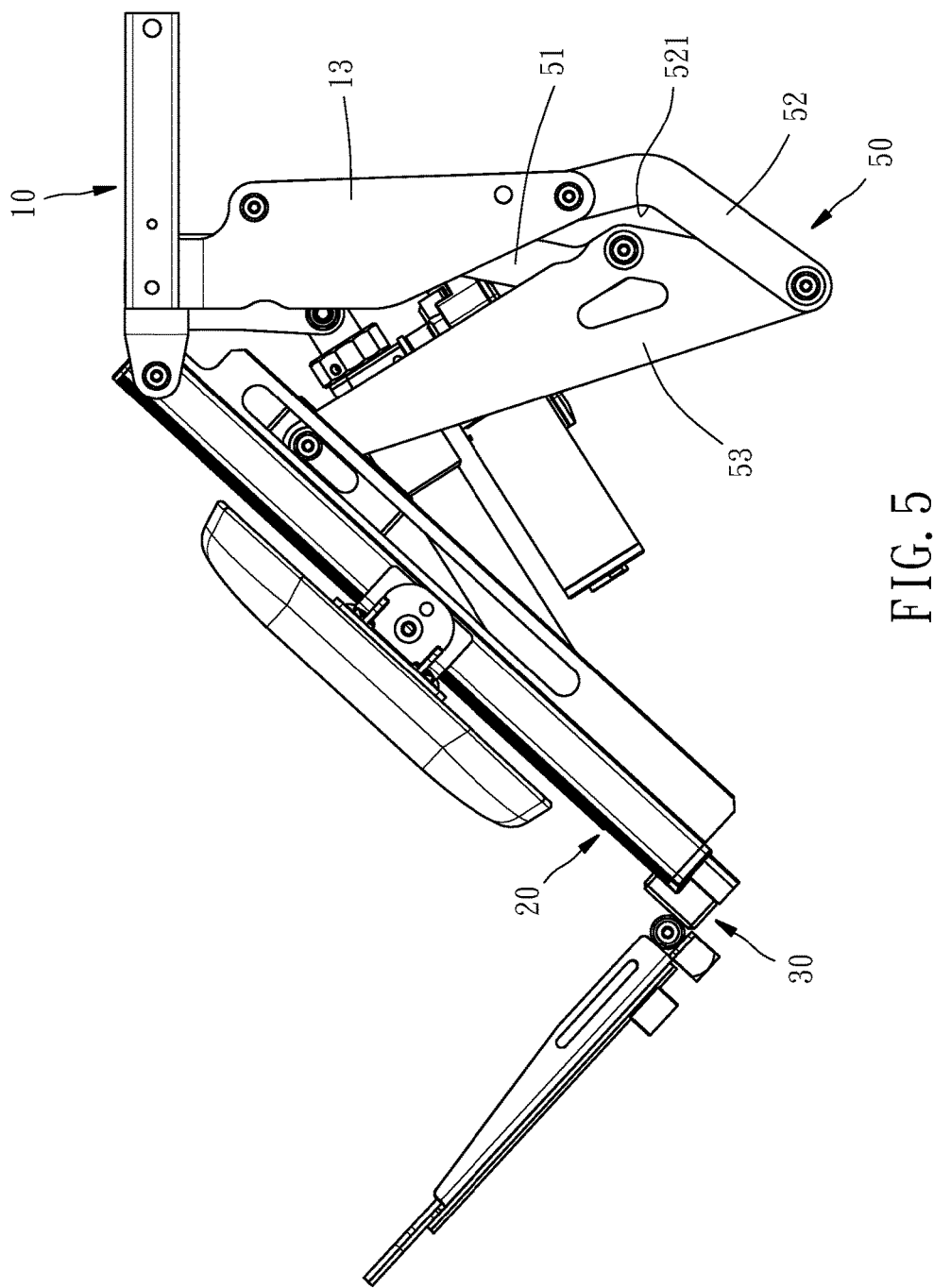
FIG. 5 is another assembled side view of the preferred embodiment in FIG. 1, showing a lifted state.
Figure 6:
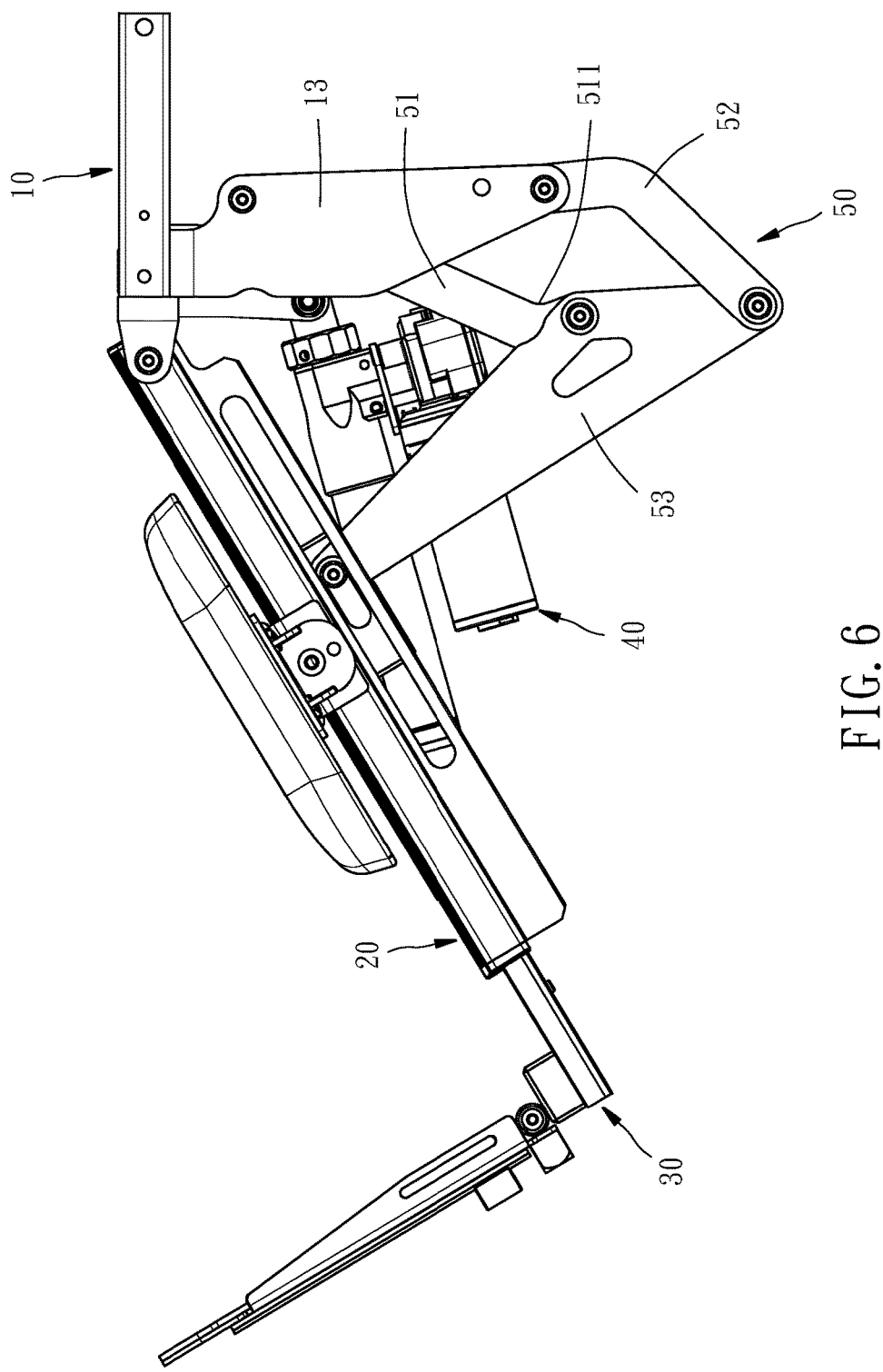
FIG. 6 is still another assembled side view of the preferred embodiment in FIG. 1, showing another lifted state.
Figure 7:
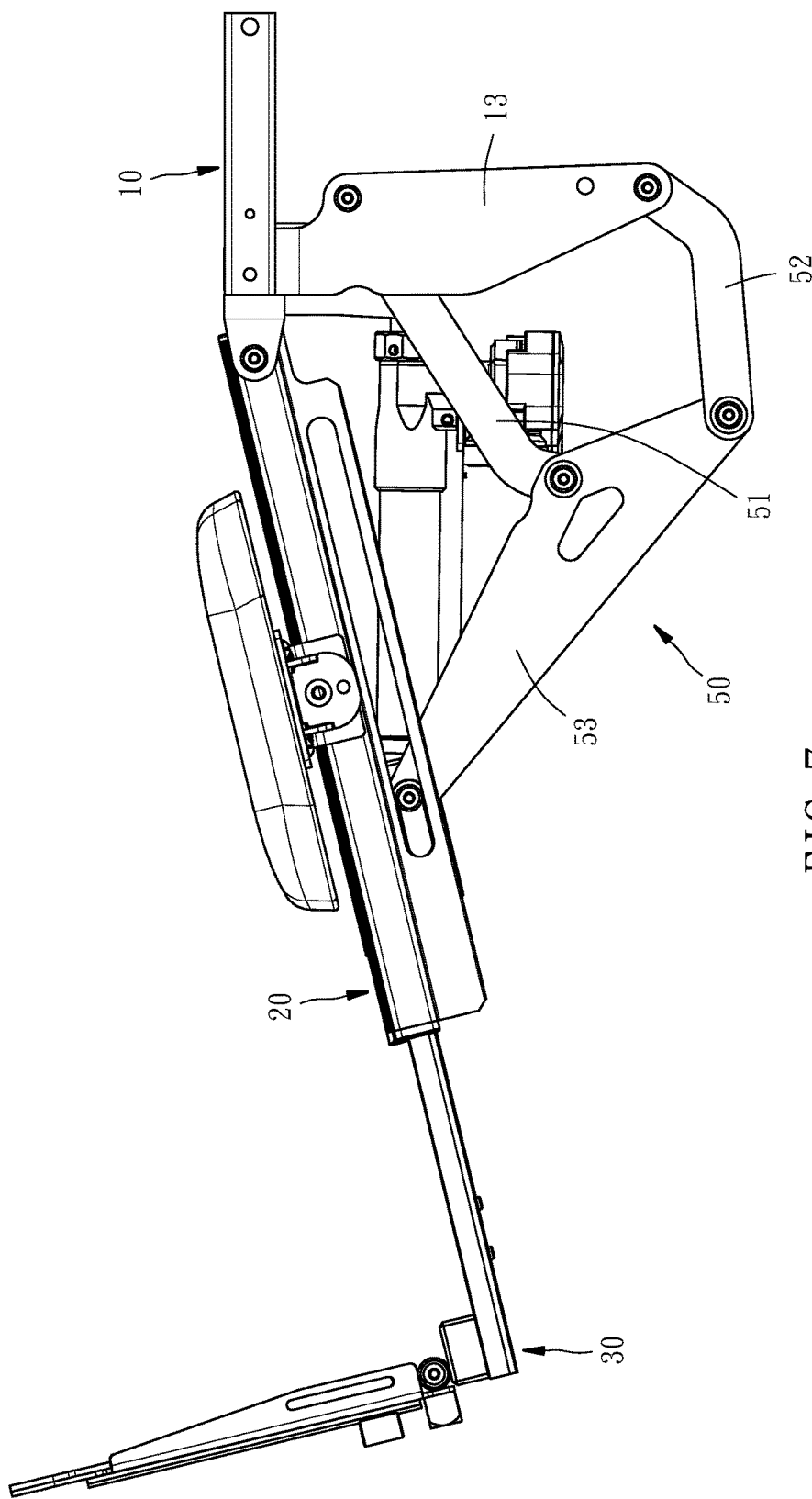
FIG. 7 is yet another assembled side view of the preferred embodiment in FIG. 1, showing still another lifted state.
Figure 8:
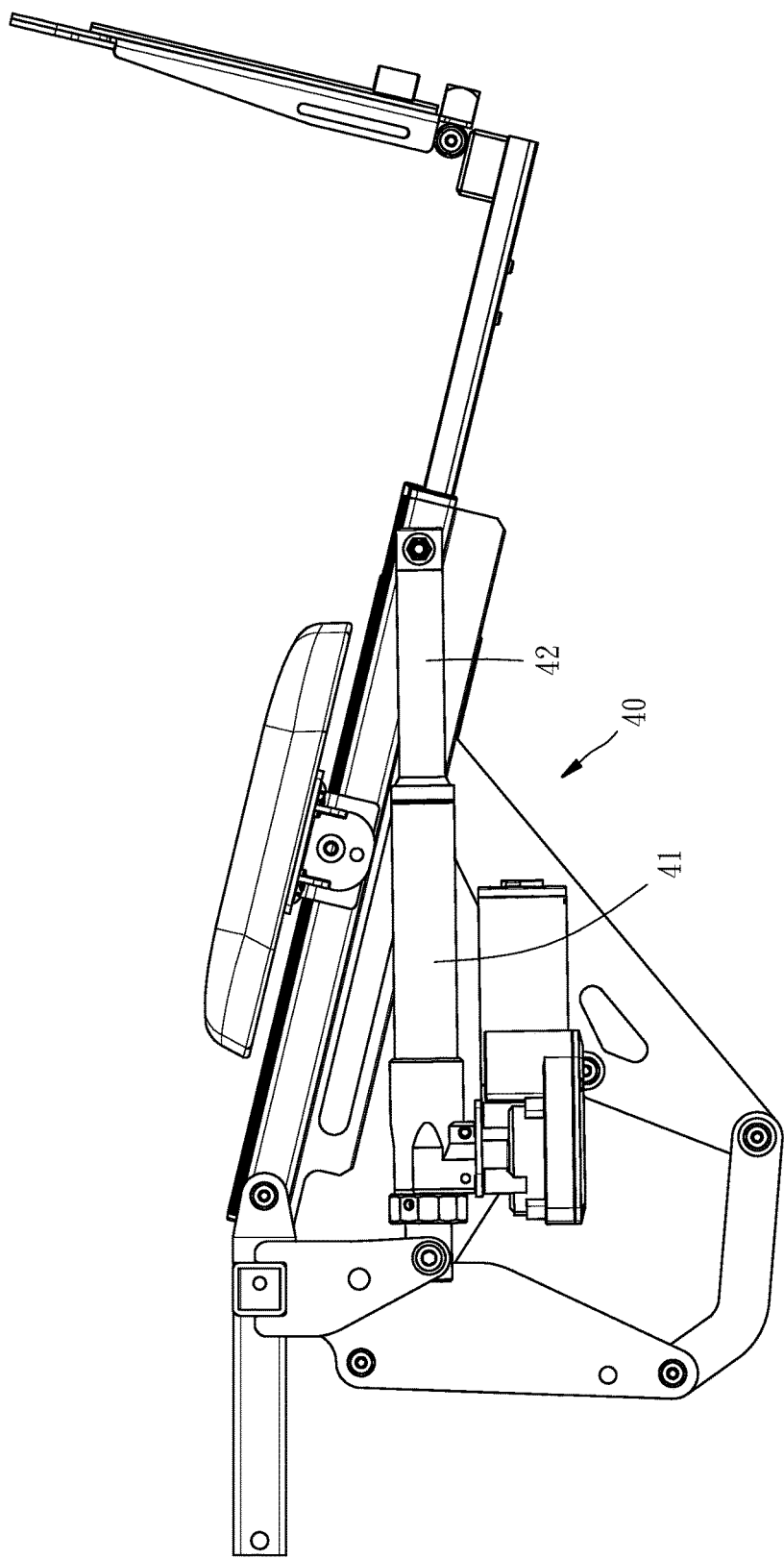
FIG. 8 is a rear view of FIG. 7.
Figure 9:
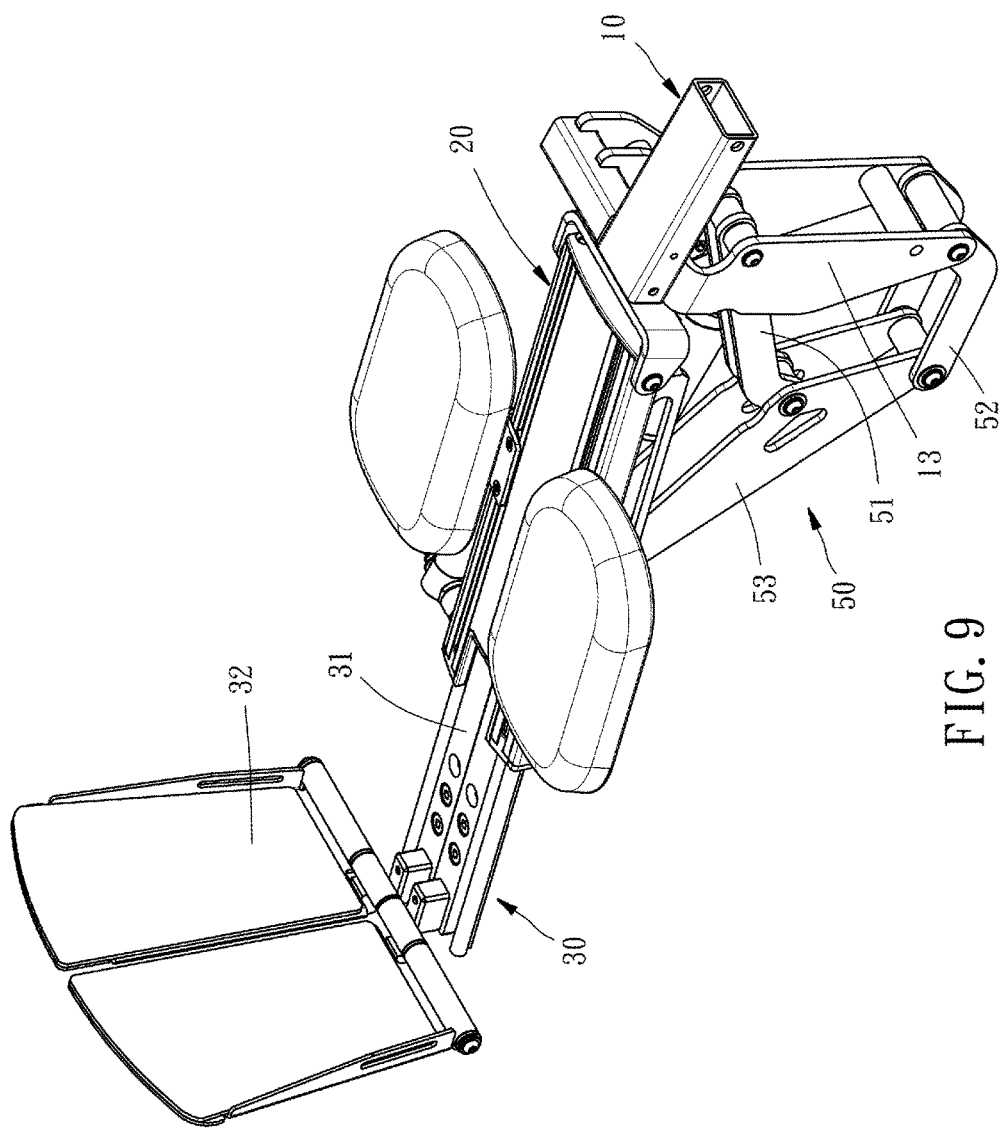
FIG. 9 is a perspective view of FIG. 7.

The foregoing preferred embodiment of the present invention is operated as follows:

FIG. 1 to FIG. 3 show the not-lifted state.

To perform a lifting operation, the actuation unit 40 is driven so that the second actuating rod 42 extends with respect to the first actuating rod 41, thereby pivoting the first lifting unit 20 with respect to the supporting unit 10.

In the meantime, the linkage unit 50 is driven by the first lifting unit 20. The first connecting members 51, the second connecting members 52, and the third connecting members 53 of the linkage unit 50 act as a four-bar linkage while the sliding blocks 60 slide in their respective slide grooves 22 of the first lifting unit 20.

FIG. 5 to FIG. 9 show the lifting process and several lifted states.

When it is desired to return from a lifted state to the not-lifted state, the actuation unit 40 only has to fully retract the second actuating rod 42, and the folding operation is completed.

The actuation unit 40, which is configured to control the first lifting unit 20, need not be long enough to control the second lifting unit 30. Therefore, the space occupied by the components of the actuation unit 40 can be reduced, and the space required for actuation is nothing more than that required for the lifting operation. Also, interference with the chassis or the seat of the power vehicle is avoided.

The combination and actuation of the first connecting members 51, the second connecting members 52, and the third connecting members 53 of the linkage unit 50 enable securer support than is possible in the prior art, and the moving paths and speeds of the connecting members can be designed to reduce any discomfort caused to a user's legs.

Stability of support is further enhanced by the fact that the second connecting members 52 are provided between opposite lateral parts of the third supporting member 13, that the third connecting members 53 are provided between the second connecting members 52, that the first connecting members 51 are provided between the third connecting members 53, and that the first connecting members 51 are provided between the opposite lateral parts of the third supporting member 13. As the connecting members are provided in pairs, and each pair of connecting members are spaced apart, the leg rest device is both light and stable.

The arrangement of the sliding blocks 60 in their respective slide grooves 22 of the first lifting unit 20 also contributes to stability of support.

According to the above, the present invention is advantageous over the prior art in that the second lifting unit 30, configured to be driven by actuation of the linkage unit 50, receives relatively stable support, that the size and actuation space of the linkage unit 50 are relatively small, and that the first lifting unit 20 and the second lifting unit 30 can be actuated smoothly and stably. The objective of the present invention is thus achieved.

What is claimed is:

1. A leg rest device of a power vehicle, comprising:
   a supporting unit;
   a first lifting unit pivotally provided at and pivotable with respect to the supporting unit;
   a second lifting unit mounted to the first lifting unit and movable in a telescoping manner;
   an actuation unit connected to the supporting unit and configured to drive the first lifting unit; and
   a linkage unit having a first connecting member, a second connecting member, and a third connecting member, wherein the first connecting member and the second connecting member are separately and pivotally connected to the supporting unit, and the third connecting member is separately and pivotally connected to the first connecting member, the second connecting member, and the second lifting unit, wherein a distance from the a center of a pivot joint between the first connecting member and the third connecting member of the linkage unit to a center of a pivot joint between the first connecting member and the supporting unit is greater than a distance from the center of the pivot joint between the first connecting member and the supporting unit to a center of a pivot joint between the second connecting member and the supporting unit.

2. The leg rest device of claim 1, wherein the first connecting member of the linkage unit has an escape portion configured to avoid pivotally connected portions of the supporting unit and the second connecting member, and the second connecting member has an escape portion configured to avoid pivotally connected portions of the first connecting member and the third connecting member.

3. The leg rest device of claim 1, wherein a distance from a center of a pivot joint between the first connecting member and the third connecting member of the linkage unit to a center of a pivot joint between the first connecting member and the supporting unit is greater than a distance from a center of a pivot joint between the second connecting member and the third connecting member to a center of a pivot joint between the second connecting member and the supporting unit.

4. The leg rest device of claim 3, wherein a line extending from the center of the pivot joint between the first connecting member and the third connecting member to a center of a pivot joint between the third connecting member and the second lifting unit and a line extending from the center of the pivot joint between the first connecting member and the third connecting member to the center of the pivot joint between the second connecting member and the third connecting member form an included angle less than 180 degrees.

5. The leg rest device of claim 3, wherein the first lifting unit has a slide groove, and a sliding block is provided at pivotally connected portions of the third connecting member and the second lifting unit and is slidably fitted in the slide groove of the first lifting unit.

6. The leg rest device of claim 1, wherein a line extending from a center of a pivot joint between the first connecting member and the third connecting member to a center of a pivot joint between the third connecting member and the second lifting unit and a line extending from the center of the pivot joint between the first connecting member and the third connecting member to a center of a pivot joint between the second connecting member and the third connecting member form an included angle less than 180 degrees.

7. The leg rest device of claim 6, wherein the first lifting unit has a slide groove, and a sliding block is provided at pivotally connected portions of the third connecting member and the second lifting unit and is slidably fitted in the slide groove of the first lifting unit.

8. The leg rest device of claim 1, wherein the first lifting unit has a slide groove, and a sliding block is provided at pivotally connected portions of the third connecting member and the second lifting unit and is slidably fitted in the slide groove of the first lifting unit.

9. A leg rest device of a power vehicle, comprising:
   a supporting unit;
   a first lifting unit pivotally provided at and pivotable with respect to the supporting unit;
   a second lifting unit mounted to the first lifting unit and movable in a telescoping manner;
   an actuation unit connected to the supporting unit and configured to drive the first lifting unit; and
   a linkage unit having a first connecting member, a second connecting member, and a third connecting member, wherein a distance from a center of a pivot joint between the first connecting member and the third connecting member of the linkage unit to a center of a pivot joint between the first connecting member and the supporting unit is greater than a distance from a center of a pivot joint between the second connecting member and the third connecting member to a center of a pivot joint between the second connecting member and the supporting unit.

10. The leg rest device of claim 9, wherein a line extending from the center of the pivot joint between the first connecting member and the third connecting member to a center of a pivot joint between the third connecting member and the second lifting unit and a line extending from the center of the pivot joint between the first connecting member and the third connecting member to the center of the pivot joint between the second connecting member and the third connecting member form an included angle less than 180 degrees.

11. The leg rest device of claim 9, wherein the first lifting unit has a slide groove, and a sliding block is provided at pivotally connected portions of the third connecting member and the second lifting unit and is slidably fitted in the slide groove of the first lifting unit.

12. The leg rest device of claim 9, wherein the first connecting member of the linkage unit has an escape portion configured to avoid pivotally connected portions of the supporting unit and the second connecting member, and the second connecting member has an escape portion configured to avoid pivotally connected portions of the first connecting member and the third connecting member.

13. A leg rest device of a power vehicle, comprising:
a supporting unit;
a first lifting unit pivotally provided at and pivotable with respect to the supporting unit;
a second lifting unit mounted to the first lifting unit and movable in a telescoping manner;
an actuation unit connected to the supporting unit and configured to drive the first lifting unit; and
a linkage unit having a first connecting member, a second connecting member, and a third connecting member, wherein a line extending from a center of a pivot joint between the first connecting member and the third connecting member to a center of a pivot joint between the third connecting member and the second lifting unit and a line extending from the center of the pivot joint between the first connecting member and the third connecting member to a center of a pivot joint between the second connecting member and the third connecting member form an included angle less than 180 degrees.

14. The leg rest device of claim 13, wherein the first lifting unit has a slide groove, and a sliding block is provided at pivotally connected portions of the third connecting member and the second lifting unit and is slidably fitted in the slide groove of the first lifting unit.

15. The leg rest device of claim 13, wherein the first connecting member of the linkage unit has an escape portion configured to avoid pivotally connected portions of the supporting unit and the second connecting member, and the second connecting member has an escape portion configured to avoid pivotally connected portions of the first connecting member and the third connecting member.

\* \* \* \* \*